United States Patent [19]

van Mil

[11] 4,434,526
[45] Mar. 6, 1984

[54] DEVICE FOR SEPARATING AND PROCESSING THE GIZZARDS OF SLAUGHTERED POULTRY

[75] Inventor: Martinus P. G. van Mil, Boxmeer, Netherlands

[73] Assignee: Stork PMT BV, Netherlands

[21] Appl. No.: 347,531

[22] Filed: Feb. 10, 1982

[30] Foreign Application Priority Data

Mar. 4, 1981 [NL] Netherlands ............... 8101055

[51] Int. Cl.³ .................. A22C 21/00; A22C 21/06
[52] U.S. Cl. ........................................ 17/11; 17/50
[58] Field of Search ........................ 17/11, 21, 50

[56] References Cited

U.S. PATENT DOCUMENTS

| 3,480,991 | 12/1969 | Edwards, Sr. | 17/11 |
| 3,990,128 | 11/1976 | van Mil | 17/43 |
| 4,057,875 | 11/1977 | Hill | 17/11 X |

Primary Examiner—Willie G. Abercrombie
Attorney, Agent, or Firm—Newton, Hopkins & Ormsby

[57] ABSTRACT

A device for separating the gizzard from the connected entrails of slaughtered poultry comprising an inlet, two oblong cylindrical parallel rotating transport elements and a gizzard separating device, the first element with a helical transport ribbon along its circumference and the second element with at least one row of longitudinal short ribs projecting from the surface and fitting between the screw ribbon of the first element.

6 Claims, 10 Drawing Figures

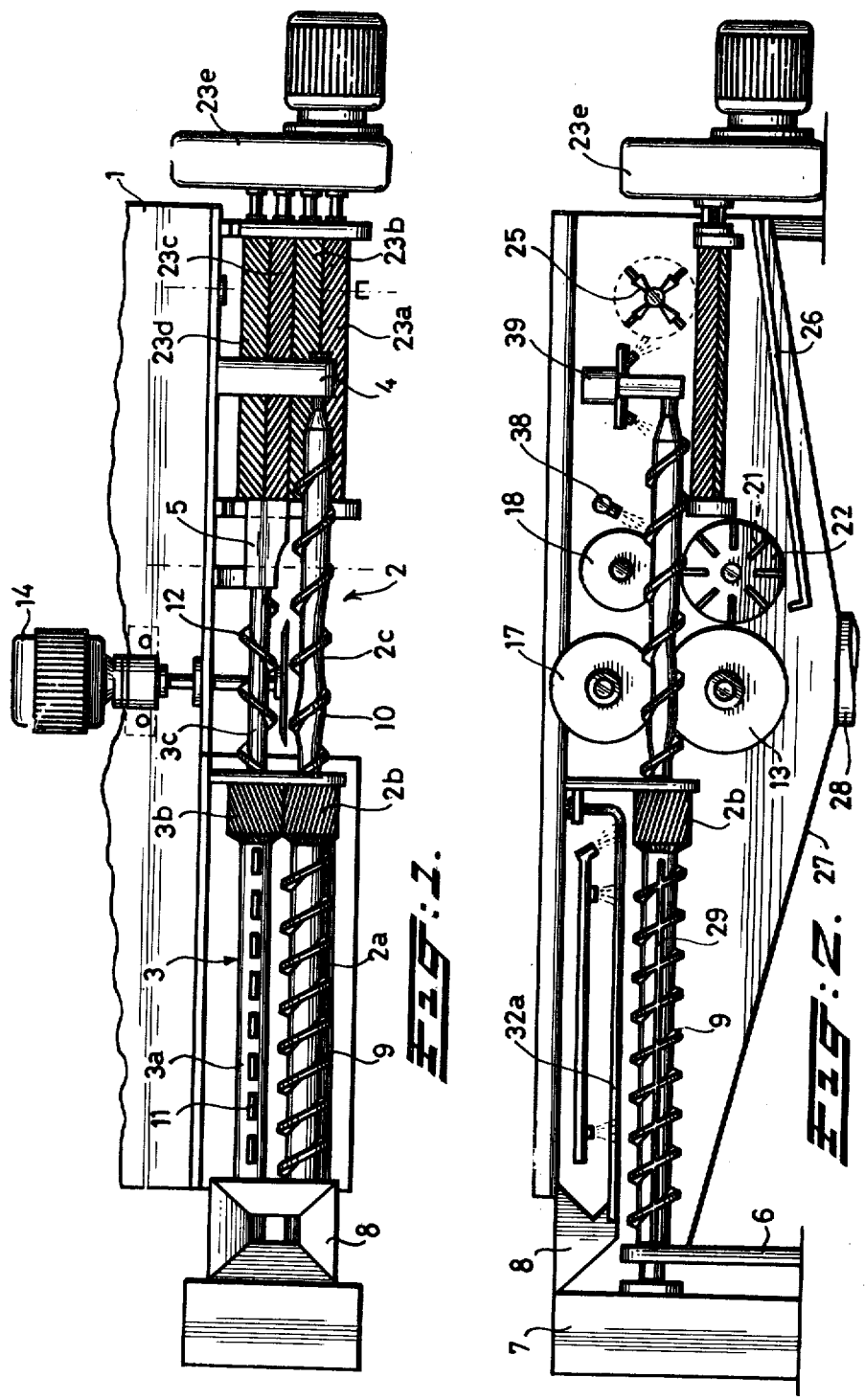

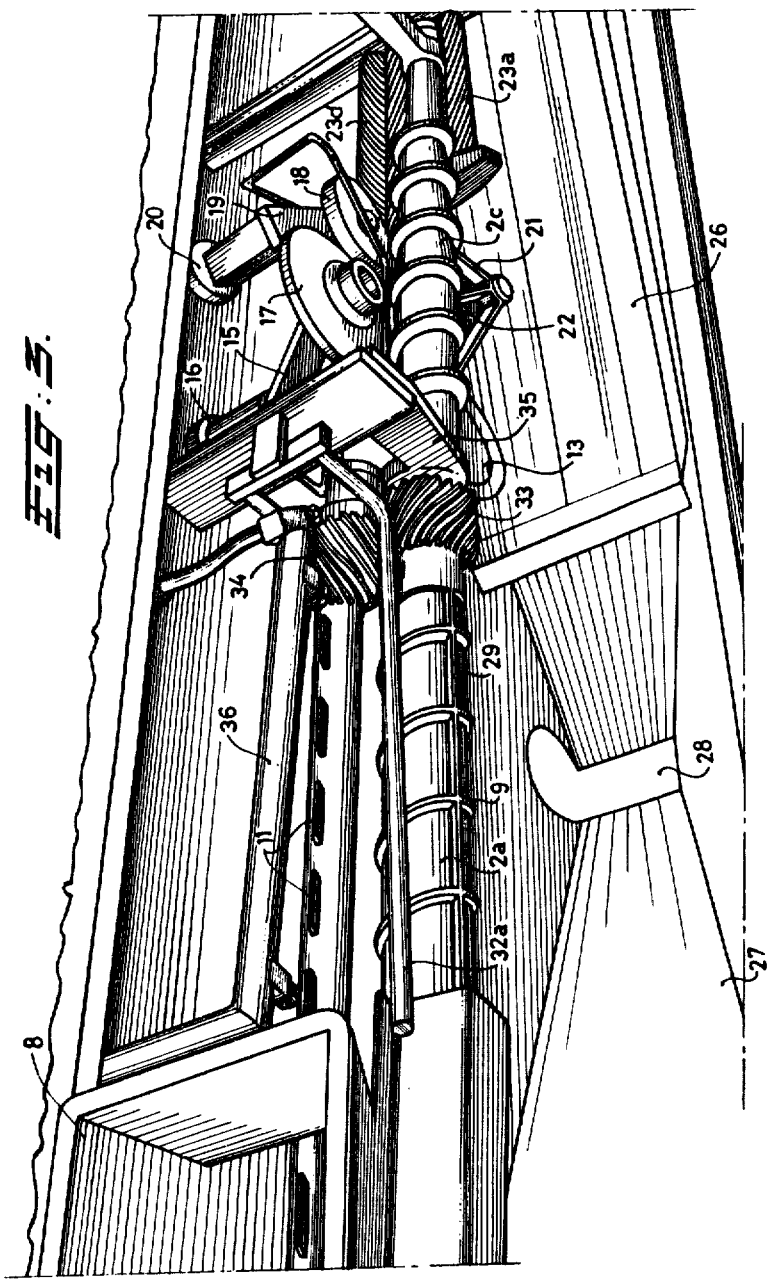

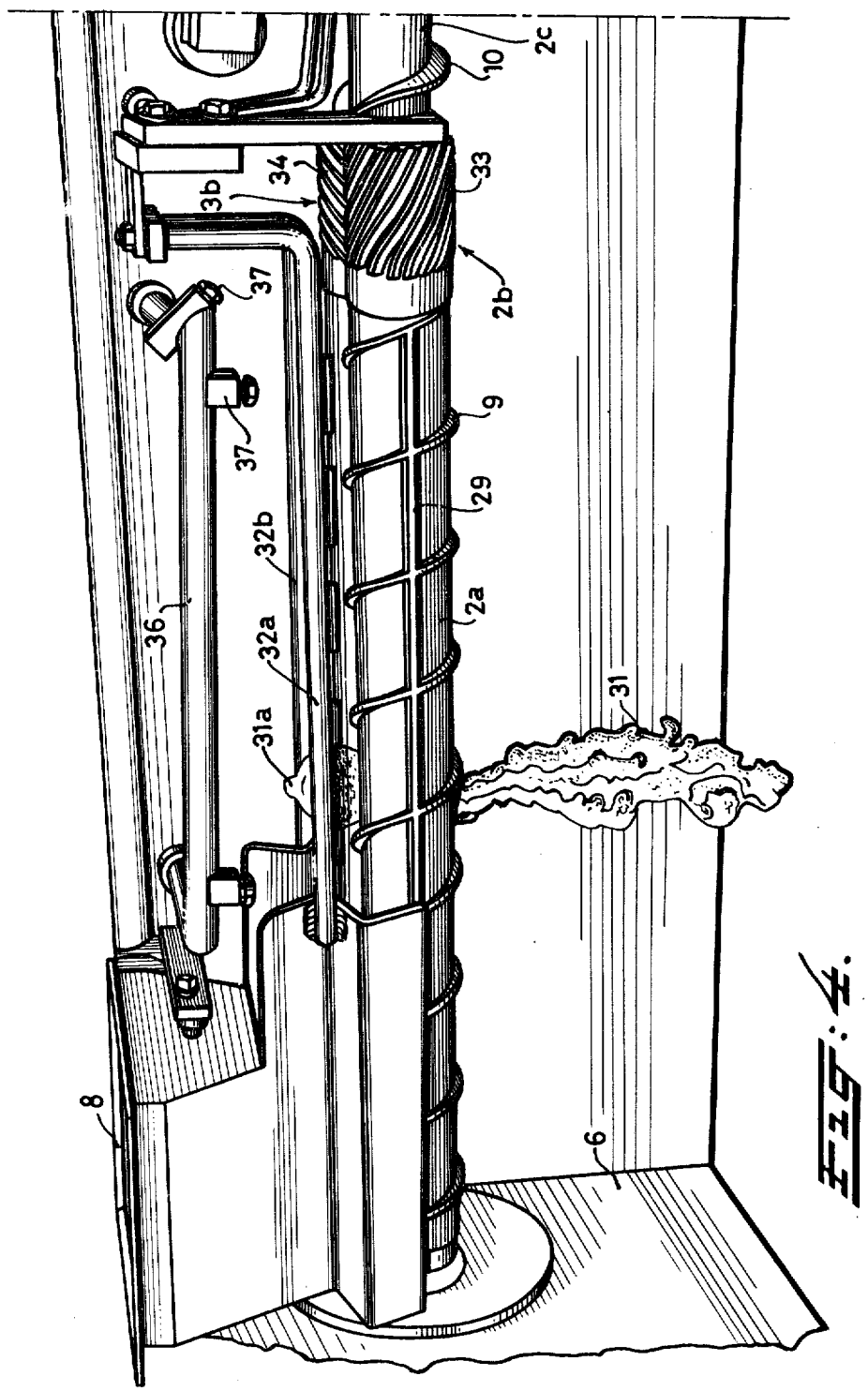

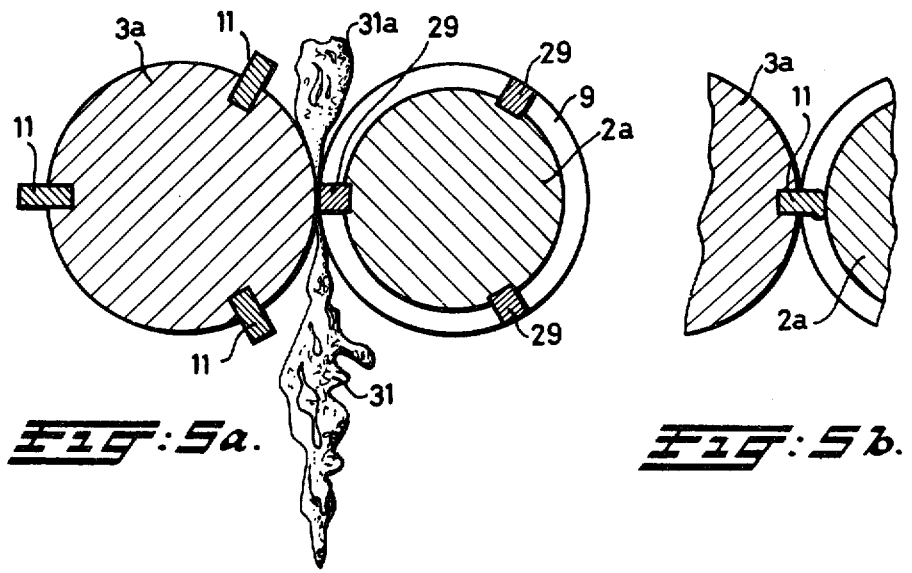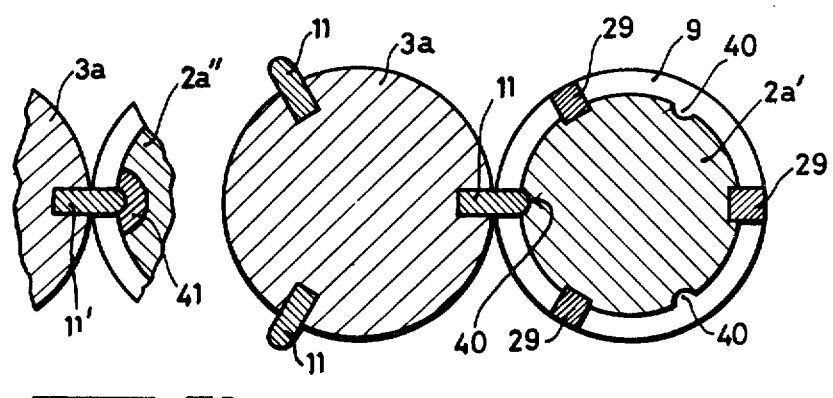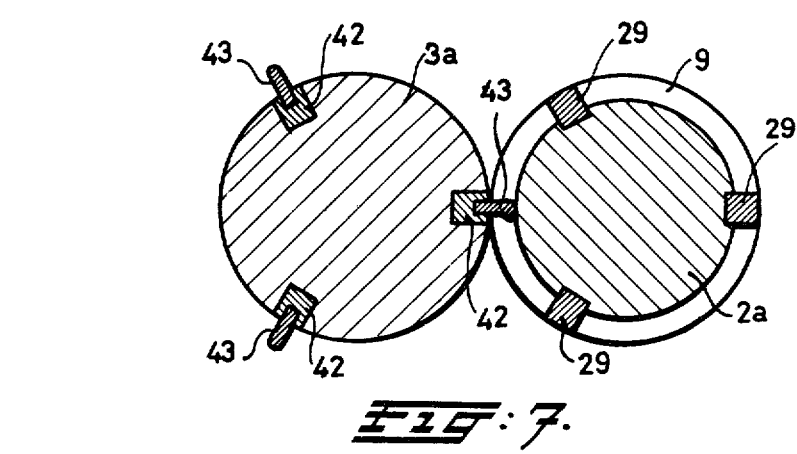

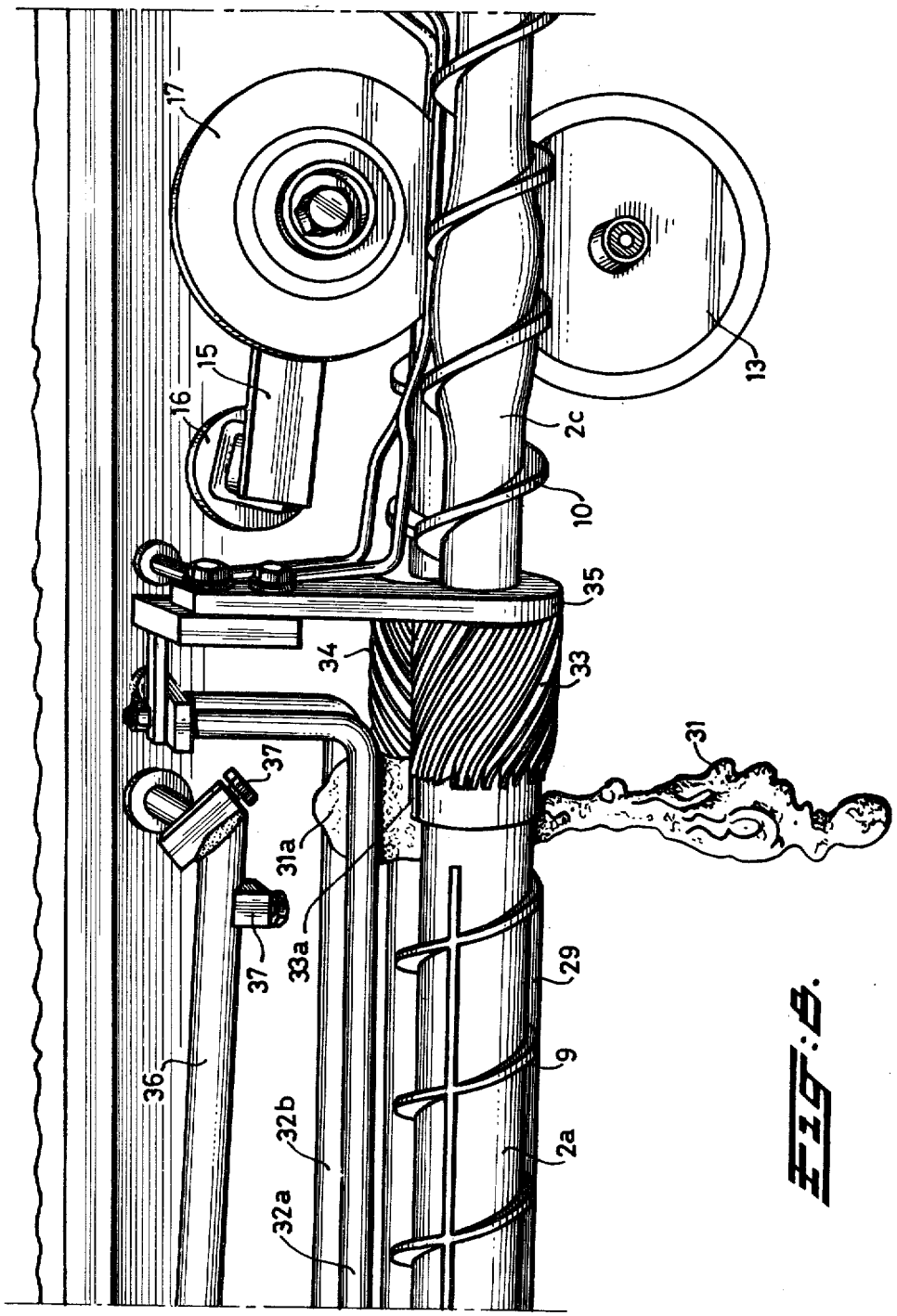

DEVICE FOR SEPARATING AND PROCESSING THE GIZZARDS OF SLAUGHTERED POULTRY

BACKGROUND OF THE INVENTION

1. Field of the Invention

The invention relates to a device for the separation of the gizzard from the connected entrails of slaughtered poultry, comprising an inlet for the complete entrails packet, arranged near one end of a first and a second oblong and interacting, cylindrical, mutually parallel, synchronously rotatingly in opposite directions driven transport elements, presenting the entrails packet to a gizzard separating device, the first of these elements being provided with a helical transport ribbon along its circumference.

2. Description of the Prior Art

U.S. Pat. No. 3,990,128 in the name of assignee describes a gizzard processing device. The first and second transport devices employed in this known arrangement space the gizzard from the entrails packet still connected therewith, as a result of which the subsequent separation of this entrails packet from the gizzard by means of the gizzard separation device is made possible.

In this known arrangement an increase in capacity, by means of which a larger number of complete entrails packets can be processed per unit of time, gives rise to problems in that the spacing of the stomachs from entrails packets is no longer undertaken correctly, so that the gizzard separating device does not operate correctly.

SUMMARY OF THE INVENTION

It is a primary object of the present invention to eliminate these shortcomings and, using simple construction elements, to so modify the transport elements that even at a high production rate, when the transport elements rotate rapidly, correct transportation and spacing of the parts to be processed is obtained.

In accordance with the invention this objective is achieved in that the second transport element is provided along its circumference with at least one row of longitudinal, short, ribs, projecting from the surface, which fit between the screw ribbons of the first transport element and interact in such a way with the surface sections of this transport element that the entrails packet is positively spaced from the gizzard.

The intimate interaction between the projections on one transport element and the surface of the second transport element ensures that solely the entrails packet without the gizzard which is still connected therewith, is positively, rapidly and reliably forced through between the transport elements, even with the latter operating at high speeds.

In a preferred embodiment one or more rows of recesses into which the ribs fit are formed in the first transport element and preferably the projections and/or the surface of the recesses interacting therewith are designed so as to give way mutually and elastically.

The projections can be formed of plastics or rubber; furthermore at least the surface portion of the recesses interacting with the projections can be formed from plastics or rubber. An embodiment is also feasible where the ribs of one row consist of crenellated raised portions of a one-piece supporting strip fixed in the second transport device.

Preferably there are three rows of ribs, located around the circumference of the second transport element and projecting therefrom.

The measures described above can be employed in combination with an embodiment in which the first transport element is provided with at least one rib which is essentially parallel with the axis thereof and projects from the surface above the screw ribbon, and where the second transport element is provided with at least one groove which corresponds therewith.

In the arrangement known from the previously mentioned U.S. Pat. No. 3,990,128 a third and fourth transport element provided with a helical ribbon terminate the first and second transport elements, and at the point of transition between the two sets of transport elements there is a rotary cutting knife which is positioned transverse to the direction of transport. By means of this cutting knife the stomach is separated from the gizzard and at the same time the duodenum which terminates at a short distance from the point of attachment of the stomach to the gizzard is cut off.

Since the cutting action of this rotary cutting knife takes place in a horizontal plane, it cannot be avoided that, if the duodenum is to be cut off completely from the gizzard, at the same time a portion of the gizzard is removed, resulting into a loss in product fit for consumption; if on the other hand it is desired to leave the gizzard intact and the knife is so adjusted that this cuts off solely the stomach, a portion of the duodenum remains attached to the gizzard and this has to be removed subsequently in an extra operation. Furthermore it has been shown that when, with this known arrangement, the transport speed of the entrails packet is increased, cutting off takes place irregularly and no longer at the correct position.

The present invention aims to overcome these difficulties. In accordance with the invention this is achieved by employing cylindrical gizzard separating elements which are arranged close to the other end of the transport devices, connected therewith, and also driven in rotary and mutually synchronous fashion, provided on their external circumference with intermeshing helical teeth.

As a result of the action of the transport elements described above, the entrails packet always reaches the separating elements with the gizzard resting on the transport elements and with the remainder of the entrails hanging underneath; during the subsequent movement between the separating elements both the duodenum and the stomach are gripped between the teeth and the gizzard, resting on the separating elements, is moved further on. The gizzard can then be fed by means of adjacent transport elements to a known type of cutting knife so that it can be cut open.

A simple embodiment is obtained when the separating elements are connected co-axially with the transport elements and of one separating element a helical tooth extends to the end of the screw ribbon on the adjacent transport element.

Good separation is facilitated by employing teeth on the separating elements with an essentially rectangular cross section.

Efficient guidance of the gizzards over the transport elements is facilitated by two guide rods which are arranged on either side of the tangential plane between the first and second transport element.

U.S. Pat. No. 3,990,128 shows the use of a mechanical cleaning device for cleaning the gizzard which has been cut open after separation. The invention proposes to construct this cleaning device as a double-bevel wheel, the circumference of which supports essentially radial ribs, to be driven rotatingly and having its centre line transverse to the direction of transport.

The invention will be better understood by reference to the following detailed description in connection with the accompanying drawings in which like reference symbols designate like parts throughout the figures.

DESCRIPTION OF THE DRAWINGS

FIG. 1 is a top view of an embodiment in accordance with the invention;

FIG. 2 is a side view of this embodiment;

FIG. 3 is a perspective view from the top of the embodiment shown in FIGS. 1 and 2;

FIG. 4 is a perspective view on enlarged scale of the feed end of this embodiment;

FIGS. 5a and 5b illustrate an embodiment of the ribs provided on the transport devices;

FIG. 6a illustrates a further embodiment of the transport devices;

FIG. 6b illustrates a variant thereof;

FIG. 7 illustrates yet a further embodiment of these transport devices.

FIG. 8 shows on an enlarged scale the gizzard separating elements and the cutting knife for cutting open the gizzard.

DESCRIPTION OF THE PREFERRED EMBODIMENTS

The device illustrated in the figures comprises a frame 1, shown schematically, in which the various transport and processing elements are mounted. There are two oblong transport and processing elements 2, 3, consisting of several components which will be described in detail later. Element 2 is at the right hand end (vide the figure) mounted in the support 4, and the shorter element 3 is mounted in the support 5; at the left-hand end both elements are mounted in the support 6 and are driven rotatingly by a gear box 7 which is indicated schematically. The drive is such that the elements rotate with equal angular velocity in mutually opposite directions.

The packets of entrails to be processed by the device are introduced to the feed hopper 8 shown on the left of the figures. Starting from this feed hopper 8 element 2 comprises the following components:

A component 2a provided with a helical ribbon 9 which is designed to transport the entrails packet introduced via the feed hopper 8 to the right. Directly adjacent to this there is a gizzard separating element 2b, to be described in detail in the following, followed by a transport section 2c provided with a helical ribbon 10.

The element 3 consists of a first section 3a provided with a series of longitudinal, projecting, ribs 11. A gizzard separating element 3b which is connected with element 3a, is followed by a transport element 3c provided with a helical ribbon 12. The design of these various components will be discussed in detail in the following part.

As already known from the U.S. Pat. No. 3,990,128 a cutting knife 13, driven in rotary fashion by the drive motor 14, is placed between the transport elements 2c and 3c. Above this a guide wheel 17 is installed, supported by the arm 15 which pivots in the bearing 16. These components are followed, in the direction of movement of the gizzard, by a second guide wheel 18, supported by arm 19 (vide FIG. 3) and the pivot 20, whilst a double-bevel gizzard cleaning wheel 22, driven rotatingly and provided with radial ribs 21, is arranged underneath element 2c, 3c at the location of this guide wheel 18. Following this there are four peeling rollers 23a-23d, known as such, with the drive 23c, and above them a four-blade ejector 25 which is similarly driven rotatingly.

Underneath the peeling rollers there is a grid 26 and below this a tray 27 with discharge 28.

The various elements in the embodiment illustrated in FIGS. 1-5 are constructed as follows:

As already stated, the transport element 2a supports the helical ribbon 9 and furthermore supports three longitudinal ribs 29 distributed uniformly around the circumference and projecting a short distance beyond the helical ribbon. The element 3a supports the projecting ribs 11 which fit within the screw threads 9; furthermore three oblong grooves 30 can be formed in the circumference into which fits the portion of the ribs 29 which projects above the ribbon 9. The direction of rotation of the elements is such that a packet of entrails 31, introduced via the hopper 8 is transported from the hopper to the right, i.e. towards the gizzard separating elements 2b, 3b. During this the gizzard 31a rests above the elements 2a and 2b and the remainder of the entrails packet (head, gullet, stomach, liver and entrails) is forced downwardly between transport elements 2a, 2b so that they are hanging thereunder. The use of the ribs 11 described above, in combination with the continuous ribs 29 and the grooves 30 ensures that the entrails packet, as shown in FIG. 4, is already as a whole under the transport elements 2a, 2b at the beginning thereof, which results into a considerable increase in machine capacity. During operation each space between two adjacent screw thread parts on the right of the feed hopper 8 is filled with an entrails packet.

The ribs and surface sections thus interact in such a way that the entrails packet is positively spaced from the gizzard. FIG. 5a illustrates this effect. FIG. 5b shows how the end of a rib 11, resting against the surface of the transport element 2a, can give way elastically.

FIG. 6a shows the transport element 2a' provided with axial grooves 40 into which the ends of the ribs 11 fit.

FIG. 6b shows an embodiment in which the ribs 11' do not need to be made from material which can give way elastically, because the surface of the transport element 2a" with which they interact is provided with inserts 41 made from elastically-resilient material.

FIG. 7 shows an embodiment in which three supporting strips 42 made for example from plastics are provided in the transport device 3a, with a row of short ribs 43 projecting from each strip, the ends of which interact with the surface of the transport element 2a.

Above the elements 2a, 3a there are two guide rods 32a, 32b which provide an extra guidance to the stomach 31a.

Each of the gizzard separating elements 2b, 3b is on the outer circumference provided with helical teeth 33 and 34 respectively, having mutually opposite pitch. The helical teeth engage each other; preferably the teeth have a rectangular cross section. The helical teeth 33 has a continuous tooth portion 33a which terminates at the right end of the helical ribbon 9 and functions as a guide during the introduction of an entrails packet between the teeth 33, 34.

When such an entrails packet is introduced between the teeth 33, 34 the gizzard 31c remains supported by the teeth 33, 34 and the remainder of the entrails packet is pinched off therefrom. In practice this pinching off process occurs both at the attachment of the duodenum to the gizzard and at the transition between gizzard and stomach, so that ultimately solely the gizzard with a small part of the entrails, correctly cut off therefrom remains behind on the teeth 33, 34.

After the gizzard separating elements 2b, 3b follows a double bearing support 35, in which the two elements 2, 3 are supported in individual bearings. These continue into the components 2c, 3c each provided with a helical ribbon 10 and 12 respectively and designed for the further transportation of the separated gizzard towards the rotary cutting knife 13, by means of which the gizzard is cut open lengthwise. During this the gizzard is held by the guide wheel 17 pressing against it.

As shown especially in FIG. 1, the teeth 10 on the transport element 2c are longer than the teeth 12 on element 3c. The latter terminates just in front of the gizzard cleaning wheel 22 and the guide wheels 18 positioned thereabove. The interior of the gizzard is cleaned mechanically by the ribs 21, while the gizzard rests on the one side against this wheel 22, and is on the other side pressed by the wheels 18 and guided by transport element 2c. The gizzard then falls onto the peeling rollers 23a–23d on which the gizzard liner is removed in the conventional manner. The ejector 25 throws the gizzards to the right so that they drop out of the machine.

A spray tube 36 with nozzles 37 is placed above the transport elements 2a, 3a. Similar sprayers are provided above the transport device components 2c, 3c (indicated by the reference numeral 38) and above the peeling rollers (indicated by the reference numeral 39).

The separated entrails and the spray water are caught in the hopper-shaped tray 27 and delivered through the discharge arrangement 28. The stomach liner together with the spray water drops from the peeling rollers on to a grid 27 through which the water drains away.

Although the present invention has been shown and described in connection with a preferred embodiment thereof, it will be apparent to those skilled in the art that many variations and modifications may be made without departing from the invention in its broader aspects. It is therefore intended to have the appended claims cover all such variations and modifications as fall within the true spirit and scope of the invention.

What is claimed is:

1. A device for separating gizzards from the connected intestines of slaughtered poultry comprising side-by-side parallel synchronously counter-rotating elongated substantially cylindrical bar elements, a continuous spiral raised conveyor element for gizzards on one of said bar elements turning therewith, plural circumferentially equidistantly spaced longitudinal rows of ribs on the other bar element, the ribs in the rows being equidistantly spaced longitudinally and being of equal lengths and being adapted to enter into spaces between adjacent convolutions of said spiral raised conveyor element, the tips of said ribs wipingly contacting the cylindrical surface of the rotating bar element having the spiral raised conveyor element thereon, the engaging surfaces of the ribs and the rotating bar element having the spiral raised conveyor element thereon being adapted to mutually yield during engagement elastically, means at the upstream ends of said bar elements to deliver gizzards with attached intestines onto the upstream ends of the bar elements, and means at the downstream ends of the bar elements to complete the separation of gizzards from the intestines.

2. A device for separating gizzards from connected intestines as defined in claim 1, and said ribs being straight radially projecting plate-like elements formed of elastically deformable material.

3. A device for separating gizzards from connected intestines as defined in claim 1, and the surface portions of the bar element engaged by said ribs being constructed of elastically deformable material.

4. A device for separating gizzards from connected intestines as defined in claim 1, and plural circumferentially equidistantly spaced elongated longitudinally extending rib elements on the rotating bar element having the spiral raised conveyor element thereon and being of the same height as the conveyor element and joined with and crossing the convolutions of the conveyor element and forming therewith a series of pockets for the reception of the ribs in said rows on said other bar element.

5. A device for separating gizzards from connected intestines of slaughtered poultry comprising a pair of side-by-side parallel synchronously counter-rotating elongated cylindrical bar elements adapted at one end to receive gizzards with connected intestines and to transport the same toward a gizzard and intestines separating means at the other end of the bar elements with the bar elements supporting the gizzards during transport and the connected intestines hanging below the gizzards and bar elements during transport, a continuous spiral conveyor element for gizzards on one bar element throughout its length, plural circumferentially spaced longitudinal rows of ribs on the other bar element, the ribs of the rows being equidistantly spaced longitudinally, being of equal lengths and being straight and radial, the ribs entering spaces between adjacent convolutions of the spiral conveyor element and contacting the cylindrical surface of the bar element carrying the spiral conveyor element, and the ribs and the cylindrical surface on the opposing bar element engaged by the ribs during rotation of the bar elements being mutually elastically yielding during contact.

6. A device for separating gizzards from connected intestines as defined in claim 5, and the ribs being formed of rubber-like material.

* * * * *